(12) United States Patent
Chien (10) Patent No.: US 12,317,986 B2
(45) Date of Patent: Jun. 3, 2025

(54) 100% RECYCLABLE AND REPLACEABLE ECO-FRIENDLY PET LIPSTICK MECHANISM

(71) Applicant: Rife Plus (Shanghai) Co. Ltd, Shanghai (CN)

(72) Inventor: Chia-Hung Chien, Shanghai (CN)

(73) Assignee: Rife Plus (Shanghai) Co. Ltd, Shanghai (CN)

( * ) Notice: Subject to any disclaimer, the term of this patent is extended or adjusted under 35 U.S.C. 154(b) by 828 days.

(21) Appl. No.: 17/366,057

(22) Filed: Jul. 2, 2021

(65) Prior Publication Data

US 2022/0160102 A1    May 26, 2022

Related U.S. Application Data

(63) Continuation of application No. PCT/CN2020/131667, filed on Nov. 26, 2020.

(30) Foreign Application Priority Data

Nov. 23, 2020 (CN) .......................... 202011324002.8

(51) Int. Cl.
*A45D 40/06* (2006.01)
*A45D 40/00* (2006.01)
(Continued)

(52) U.S. Cl.
CPC .............. *A45D 40/06* (2013.01); *C08L 67/02* (2013.01); *A45D 2040/0018* (2013.01); *C08G 63/183* (2013.01)

(58) Field of Classification Search
CPC .... A45D 40/02; A45D 40/023; A45D 40/026; A45D 40/04; A45D 40/06; A45D 40/065; A45D 40/10
See application file for complete search history.

(56) References Cited

U.S. PATENT DOCUMENTS

5,399,040 A * 3/1995 Holloway .............. A45D 40/06
                                                                401/86
5,873,379 A * 2/1999 Bouix .................... A45D 40/06
                                                                401/78
(Continued)

FOREIGN PATENT DOCUMENTS

CN        203041102 U    7/2013
CN        206880330 U    1/2018
(Continued)

OTHER PUBLICATIONS

Internation Search Report of PCT/CN2020/131667, Mailed Feb. 25, 2021.

*Primary Examiner* — Rachel R Steitz
*Assistant Examiner* — Karim Asqiriba (57) ABSTRACT

A 100% recyclable and replaceable eco-friendly PET lipstick mechanism includes a cartridge core and a housing rotatably matching the cartridge core, where an axially slidable lipstick cylinder matches inside of the cartridge core, an inner wall surface of the housing is provided with a spiral groove, the cartridge core is provided with a guide groove axially, and an outer surface of the lipstick cylinder is provided with a protruding pillar, the pillar penetrating the guide groove of the cartridge core to slidably match the spiral groove of the inner wall surface of the housing; an outer circumferential surface of a rear end of the cartridge core is provided with a hand-held section; and the housing, the cartridge core and the lipstick cylinder are all made from polyethylene terephthalate (PET).

10 Claims, 12 Drawing Sheets

(51) Int. Cl.
*C08L 67/02* (2006.01)
*C08G 63/183* (2006.01)

(56) References Cited

U.S. PATENT DOCUMENTS

| | | | |
|---|---|---|---|
| 6,412,999 B1 | 7/2002 | Pierpont | |
| 9,226,882 B2 | 1/2016 | Konate et al. | |
| 10,973,228 B2 | 4/2021 | Konate et al. | |
| 2012/0248006 A1* | 10/2012 | Salciarini | A45D 40/06 206/581 |
| 2014/0270889 A1* | 9/2014 | Holloway | A45D 40/00 401/55 |
| 2022/0400834 A1* | 12/2022 | Lecureuil | A45D 40/06 |
| 2023/0085820 A1* | 3/2023 | Kim | A45D 40/065 206/385 |
| 2023/0200516 A1* | 6/2023 | Edmondson | A45D 40/06 401/55 |
| 2023/0232963 A1* | 7/2023 | Fang | A45D 40/06 206/385 |
| 2024/0041182 A1* | 2/2024 | Lin | A45D 40/023 |

FOREIGN PATENT DOCUMENTS

| | | |
|---|---|---|
| CN | 210672465 U | 6/2020 |
| CN | 111449404 A | 7/2020 |
| CN | 211269046 U | 8/2020 |
| CN | 211703767 U | 10/2020 |
| CN | 201438890 U | 4/2021 |
| JP | H08256835 A | 10/1996 |

\* cited by examiner

100% RECYCLABLE AND REPLACEABLE ECO-FRIENDLY PET LIPSTICK MECHANISM

CROSS REFERENCE TO RELATED APPLICATION(S)

This application is a continuation of International Patent Application No. PCT/CN2020/131667 with a filing date of Nov. 26, 2020, designating the United States, now pending, and further claims priority to Chinese Patent Application No. 202011324002 .8 with a fling date of Nov. 23, 2020. The content of the aforementioned applications, including any intervening amendments thereto, are incorporated herein by reference.

TECHNICAL FIELD

The present disclosure relates to the technical field of cosmetic packaging, in particular to a novel recyclable and replaceable eco-friendly Polyethylene terephthalate (PET) lipstick mechanism.

BACKGROUND

With the development of society, there are more cosmetic and skin care products such as cream cosmetics, such as foundation sticks, eye shadow applicators, blusher sticks, concealer sticks, lip balms, body balms and cream perfumes. All these products are collectively called lipsticks in a broad sense. Nowadays, the lipsticks are frequently used in daily life. The lip balms and lip sticks play an important role in making lips ruddy, shiny, moisturized, protected, and modified in contour, and therefore increasing facial beauty, and setting off the lips. The related creamy cosmetic and skin care products have also become necessary beauty cosmetics for women, which can reveal female charms. The lipsticks or the related creamy cosmetic and skin care products usually have the advantages of convenient use and durability. In addition, they are portable and convenient to apply, and therefore popular among women. However, existing packaging for the lipsticks have various defects, such as complex structure, high production cost and pollution caused by metal springs. Moreover, it is difficult to distinguish the color of contents due to opaque appearance, or improper structure results in inconvenient operation. Particularly, being made from hybrid materials, various parts of the lipstick mechanism components are not recyclable.

At present, it is well known that environmental pollution is very severe and resources become scarce. Particularly in the cosmetic field, plastic products are widely used in packaging. In addition, for the existing cosmetic packaging, for example, the lipstick mechanism internally uses springs as reset mechanisms, so the lipstick mechanism cannot be recycled upon being discarded. However, for environmental protection, energy saving and secondary utilization, it is necessary for social development to manufacture recyclable cosmetic packaging.

In view of the current international environmental circumstance, carbon emission reduction is required throughout the world. At present, both the European Union and the United States have stipulated that 90% of plastic must be recycled in 2029. As the most-recyclable plastic, existing polyethylene terephthalate (PET) has a wide range of applications and can be recycled as post-consumer recycled (PCR) content, PET plastic and textile yarns for the garment industry. However, due to structural design and performance limitations, various parts of lipstick mechanisms on the market at present are made from a variety of different materials, that is, hybrid materials, such as polyoxymethylene (POM)and polystyrene (PS). Consequently, they cannot be directly recycled, which is also an environmental protection problem to be solved urgently.

SUMMARY

An objective of the present disclosure is to overcome many defects in aspects such as structure and environmental protection of a lipstick mechanism in the prior art, and provide an eco-friendly and economic lipstick mechanism which is novel in structure, safe, sanitary, free from internal pollution, transparent, bright and flamboyant, adjustable in lipstick extension length, and completely recyclable in packaging after lipstick is used up.

The objective of the present disclosure is achieved through the following technical solution:

a 100% recyclable and replaceable eco-friendly PET lipstick mechanism includes a forked cartridge core, where a circular-tubular housing which rotationally matches outside of the cartridge core, an axially slidable lipstick cylinder matches inside of the cartridge core, an inner wall surface of the housing is provided with a spiral groove, the cartridge core is provided with a guide groove axially, and an outer surface of the lipstick cylinder is provided with a protruding pillar, the pillar penetrating the guide groove of the cartridge core to slidably match the spiral groove of the inner wall surface of the housing; an outer circumferential surface of a rear end of the cartridge core is provided with a hand-held section, an outer circumference of a portion, close to the hand-held section at the rear end, of the cartridge core is provided with at least one annular groove\an annular convex rib, an inner circumferential surface of a portion of the housing is adaptively provided with an annular convex rib\an annular groove for rotatably matching the annular groove\the annular convex rib of the cartridge core, a front end of the annular groove\the annular convex rib of the cartridge core is provided with an elastic cambered flat spring, a root of the flat spring is connected to a wall portion of the cartridge core into a whole, an end of the flat spring warps upwards to a position higher than a surface of the cartridge core, and the flat spring is clamped in the groove correspondingly provided in an inner side surface of the housing after assembled, so as to increase torque force during rotation and make rotation smoother; and the housing, the cartridge core and the lipstick cylinder are all of colorless, transparent or translucent structures uniformly made from food packaging grade nontoxic material polyethylene terephthalate (PET), with partial surfaces properly roughened.

When the cartridge core and the housing rotate relatively, the spiral groove of the housing pushes the pillar. In addition, the pillar is subjected to reverse thrust of the guide groove of the cartridge core, and consequently, resultant force of the thrust and the reverse thrust drives the pillar to move along the guide groove, such that the lipstick cylinder is driven to move axially since the pillar and the lipstick cylinder are integrated.

The cartridge core gets close to the hand-held section at the rear end to match the housing through the annular groove and the annular convex rib, and the cartridge core and the housing may be guided to rotate relatively without disengagement by matching the annular groove and the annular convex rib. The annular groove and the annular convex rib match through proper extrusion.

All parts of the device are made from transparent colorless PET material, which makes direct observation of color of original lipstick possible and therefore brings convenience to production, management, purchase or selection, and makes products more shiny and glorious. Since all the three components are made from the PET material, they may be completely recycled without the need for sorting after contents are used up. In addition, the components are colorless and undyed, which fully meet the requirements of environmental protection standards. The PET material, that is polyethylene terephthalate, is non-toxic and tasteless, and has the advantages of good sanitation and safety, low permeability of gas and water vapor, excellent gas, water, oil and odor resistance, high resistance to high temperature and low temperature, high transparency, ultraviolet resistance and good gloss. Moreover, the PET has higher hardness and corresponding higher mechanical strength than those of polystyrene (PS) and other materials used in the traditional technology. The cartridge core made from the PET may take advantage of complete recyclability of the material, which makes the structure of the device different from that of a lipstick mechanism in the traditional technology.

The device also avoids the inherent pollution risk caused by application of metal springs in the prior art.

Preferably, double threads are evenly distributed on the spiral grooves on the inner wall of the housing, the guide groove of the cartridge core includes two symmetrical straight grooves, and two corresponding pillars protruding from the outer surface of the lipstick cylinder are symmetrically arranged.

Preferably, each of two ends of the guide groove is provided with a transverse side groove in an extension manner, and an extension direction of the side groove is opposite to a rotation direction of the spiral groove connected thereto, a mouth of the side groove is provided with a cambered protrusion point, and a width from the protrusion point to the other side of the mouth of the side groove is slightly smaller than a diameter of the pillar.

When the pillar passes through a mouth of the side groove, related structures of the mouth of the side groove are elastically deformed due to extrusion, and a surface layer of the pillar and surface layers of two side surfaces of the mouth of the side groove are elastically deformed as well. The comprehensive effect of deformation is limited to an extent that the pillar may squeeze through the mouth of the side groove. After the pillar squeezes through the mouth of the side groove, all the related structures and surface layers are elastically restored. Due to thrust and inertia during squeezing, the pillar continues to move forward and may hit a bottom or a side wall of the side groove, which causes vibration and makes a clattering sound due to elastic recovery and impact. The sound may inform an operator about a state of motion. A cambered structure of the protrusion point of the mouth of the side groove is conducive to expansion of extrusion deformation, reduction of wearing, and a short stroke.

Preferably, a spiral inclination angle of the spiral groove is 25°-35°.

Preferably, the protruding pillar and the lipstick cylinder are of an integrated structure made through injection molding, and the housing, the cartridge core and the lipstick cylinder are all of colorless, transparent or translucent structures uniformly made from food packaging grade nontoxic material PET, with partial surfaces roughened.

Preferably, the outer circumferential surface of the rear end of the cartridge core is provided with the hand-held section, an outer circumferential surface of which is provided with a straight or rhombic pattern.

Preferably, an inner surface of the lipstick cylinder is provided with several reinforcing ribs axially.

Preferably, a portion from a middle to a front end of the guide groove is provided with several additional side grooves parallel to each transverse side groove extended in two ends, and an extension direction of the several side grooves is the same as that of the side groove of the front end; the portion, close to the hand-held section at the rear end, of the cartridge core is provided with three annular convex ribs, and a certain distance is reserved between the three annular convex ribs; and the housing is provided with two annular grooves, a certain width is reserved between the two annular grooves, the three annular convex ribs have certain axial clearances after matching the two annular grooves, and the cartridge core and the housing may axially have a certain relative slide distance through the clearance.

Preferably, the flat spring is of one or more hollowed structures, when one flat spring is arranged, the flat spring is wrapped around an outer side wall of the cartridge core by one circle, when more than one flat spring is arranged, they are uniformly distributed on an outer side wall of the cartridge core, the hollowed structure includes several spacers, a root of the spacer in a middle is connected to a wall portion of the cartridge core, a hardness and a thickness of the root of the spacer in the middle are greater than those of other spacers, an end of the spacer in the middle is provided with a protrusion outwards, the protrusion abuts against an inner side wall of the housing, and the protrusion becomes thinner outwards, so as to have a shape similar to a back of a horn comb; and a bottom of the hand-held section is provided with a protruding outer edge, the protruding outer edge being arranged in a position where the annular groove\the annular convex rib on the outer circumference of the hand-held section rotates relative to the annular convex rib\the annular groove on the housing. The spacer in the middle on the flat spring has three main functions: firstly, the flat spring plays the role of fixing the cartridge core and the housing; secondly, since a diameter of the spacer in the middle on the flat spring is greater than that of other portions of the cartridge core, so when the cartridge core is clamped inside the housing and the hand-held section is rotated manually, excessive touch friction between other portions of the wall portion of the cartridge core and the housing is avoided, accordingly, rotation difficulty is avoided, such that a user may rotate the device with proper rotation force, and use the device easily; and thirdly, the shape, similar to the back of the horn comb, of the spacer in the middle on the flat spring, may reduce friction force between the wall portion of the cartridge core and the inner side wall of the housing. The protruding outer edge has a limiting function, that is, the spacer in the middle on the flat spring on the cartridge core is clamped on the inner side wall of the housing, and with the aid of a limiting function of the protruding outer edge on the hand-held section, the cartridge core may be firmly fixed in the housing and may rotate relatively.

A newly-produced lipstick mechanism is always filled with most lipstick, and a length of the lipstick is also in a longest state. If the side groove at the front end is merely relied on for positioning a protruding length of the lipstick cylinder, the newly-filled lipstick may obviously protrude far out of the end of the cartridge core. However, if the pillar and the lipstick mechanism are positioned through random positions in a middle of the spiral groove, an unstable state may be caused and affect use. With multiple side grooves capable of positioning the lipstick cylinder differently, the user may operate as required to make the lipstick cylinder protrude out of the end of the cartridge core by a proper length.

Preferably, a cap is arranged outside the housing, a bottom of a front end of the cap is of a closed structure, and the cap is formed by matching a front cap body and a rear cap body.

The present disclosure has the following beneficial effects:

1. the lipstick mechanism of the present disclosure is compact and concise in structure, and is composed of only three parts, all of which may be manufactured in batch by injection molding with low cost, injection molded members do not need secondary processing, so as to be convenient and fast to assemble, especially, the spiral groove is directly provided on the inner surface of the housing, thus avoiding the disadvantage of conventional assembly using discrete components;

2. since all the parts are transparent and colorless, the color of the original lipstick may be directly observed, which brings convenience to the production, the management, the purchase or the selection, and makes the products more shiny and glorious;

3. since the colorless, transparent or translucent structure formed by properly roughening the surface of some parts may be achieved by properly treating relevant surfaces of a mold, manufacturing is convenient;

4. all the three components are made from same materials and may be recycled without the need for sorting after contents are used up, which meet environmental protection requirements;

5. all the materials are non-toxic materials, thus avoiding pollution risk of the metal springs in the prior art;

6. the guide grooves and the spiral grooves as driving sources are symmetrically provided, such that a torque is balanced and rotation is stable;

7. the front end of the annular groove\annular convex rib of the cartridge core is provided with the elastic cambered flat spring, the root of the flat spring is connected to the wall portion of the cartridge core into a whole, the end of the flat spring warps outwards to be properly higher than the surface of the cartridge core, and the flat spring is clamped in the groove correspondingly provided in the inner side surface of the housing after assembled to prevent an inner body from being separated from the housing;

8. since the two ends of the guide groove are provided with the transverse side grooves in an extension manner, at the front end, the lipstick mechanism may be locked, so as to avoid the situation that the lipstick mechanism loosens or even retracts when the lipstick is applied and therefore affects applying, and at the rear end, it is guaranteed that the lipstick mechanism does not automatically slide forward when no torque acts on the housing;

9. the portion, from the middle to the front end, of the guide groove is provided with several additional side grooves parallel to the side grooves of the two ends, and with multiple side grooves capable of positioning the lipstick cylinder differently, the user may operate as required to make the lipstick cylinder protrude out of the end of the cartridge core by a proper length; and 10. the mouth of the side groove is provided with the cambered protrusion point, and the width from the protrusion point to the other side of the mouth of the side groove is slightly smaller than the diameter of the pillar, such that the pillar may be inserted into the side groove merely through extrusion, thus achieving reliable positioning, and the protrusion point may make a sound during the extrusion process to indicate the status.

In the figures: cartridge core 1; guide groove 11; hand-held section 12; annular convex rib 13; flat spring 14; side groove 15; protrusion point 16; narrow slit 17; housing 2; spiral groove 21; annular groove 22; lipstick cylinder 3; pillar 31; reinforcing rib 32; cap 4; front cap body 41; and rear cap body 42.

DETAILED DESCRIPTION OF THE EMBODIMENTS

The following describe embodiments of the present disclosure in detail with reference to accompanying drawings. The embodiments are implemented on the premise of the technical solutions of the present disclosure, and detailed implementations and specific operation processes are provided, but the protection scope of the present disclosure is not limited to the following embodiments.

Embodiment 1

Figure 1:
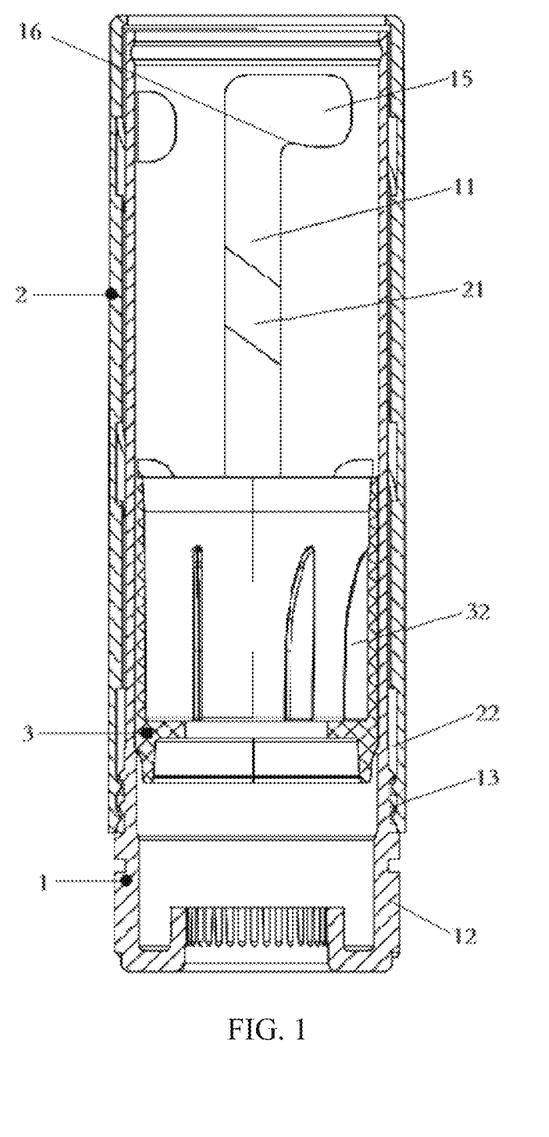
FIG. 1 is a structural schematic diagram of one embodiment of the present disclosure.
Figure 2:
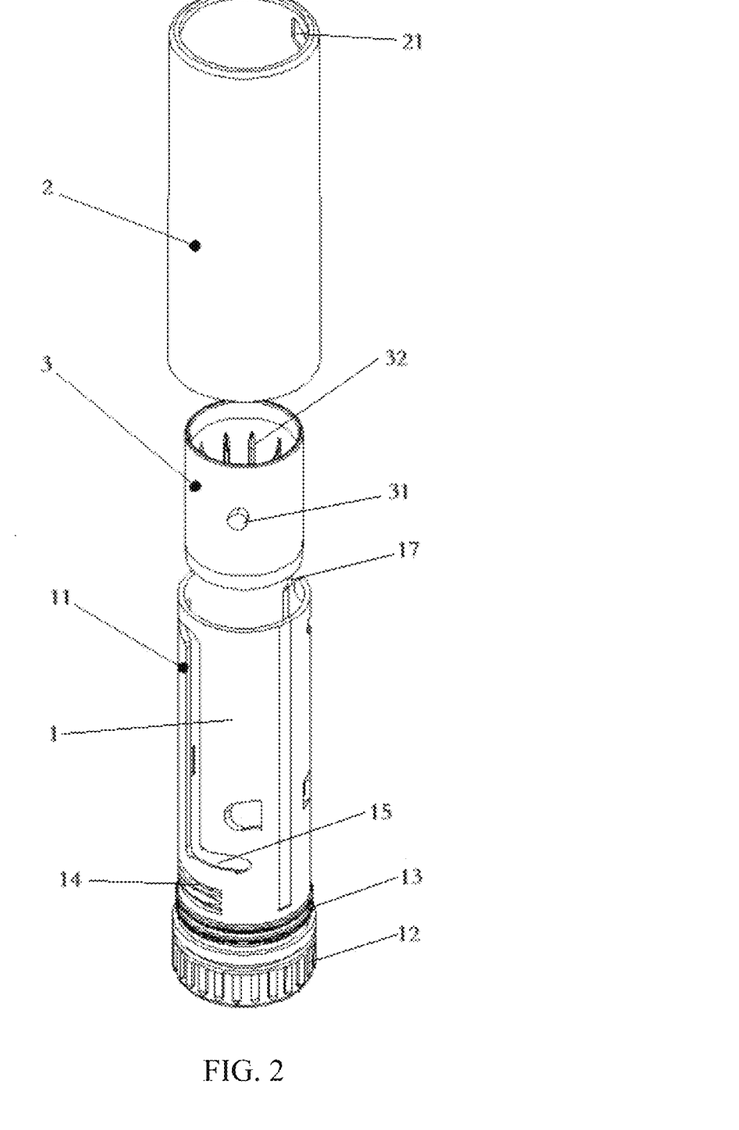
FIG. 2 is an exploded schematic diagram of one embodiment of the present disclosure.

With reference to FIG. 1 and FIG. 2, a 100% recyclable and replaceable eco-friendly PET lipstick mechanism includes a forked cartridge core 1. A circular-tubular housing 2 rotationally matches outside of the cartridge core 1, an axially slidable lipstick cylinder 3 matches inside of the cartridge core 1, an inner wall surface of the housing 2 is provided with a spiral groove 21, and the cartridge core 1 is provided with a guide groove 11 axially.

Figure 3:
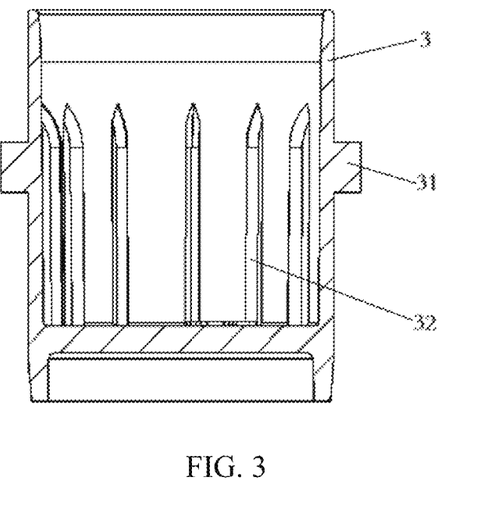
FIG. 3 is a sectional schematic diagram of a lipstick mechanism.
Figure 4:
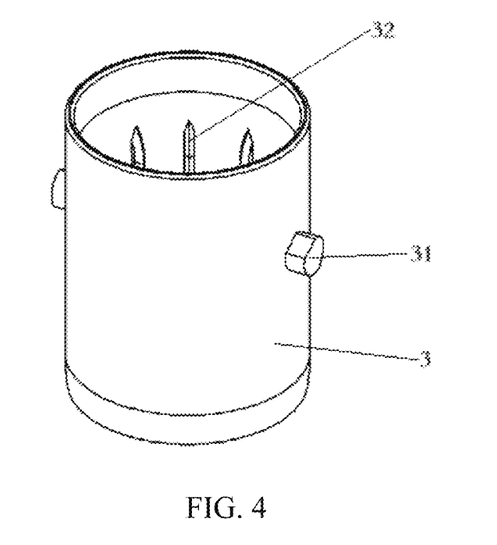
FIG. 4 is a three-dimensional schematic diagram of the lipstick mechanism.

An outer surface of the lipstick cylinder 3 is provided with a protruding pillar 31, the protruding pillar 31 and the lipstick cylinder 3 are of an integrated structure made by injection molding, as shown in FIG. 3 and FIG. 4.

Figure 5:
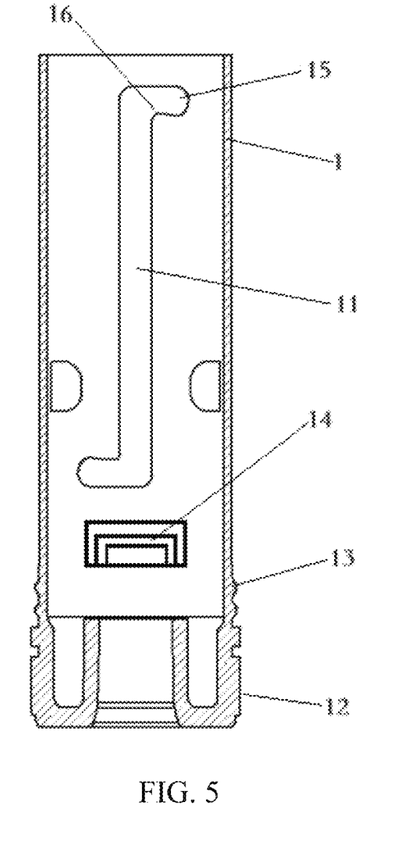
FIG. 5 is a sectional schematic diagram of a cartridge core.
Figure 6:
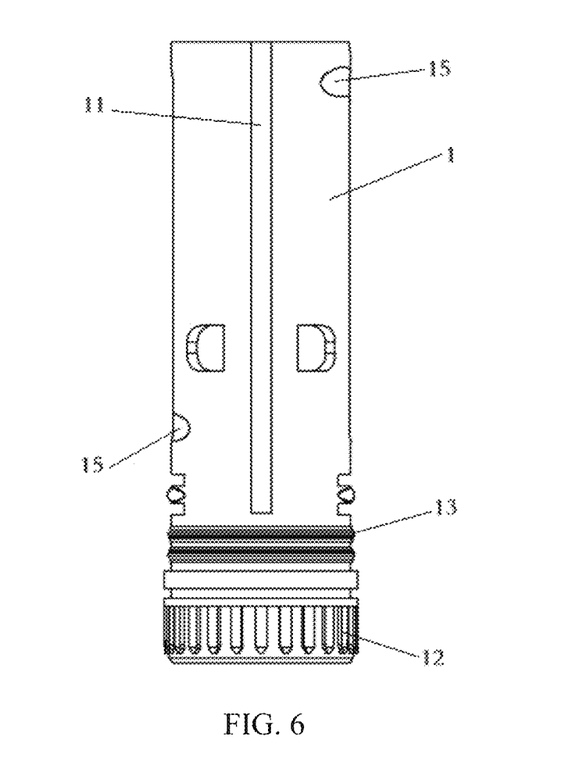
FIG. 6 is a three-dimensional schematic diagram of the cartridge core.

The pillar 31 penetrates the guide groove 11 of the cartridge core 1 to slidably match the spiral groove 21 of the inner wall surface of the housing 2, an outer circumferential surface of a rear end of the cartridge core 1 is provided with a hand-held section 12, an outer circumference of a portion, close to the hand-held section 12 at the rear end, of the cartridge core 1 is provided with two annular convex ribs 13, an inner circumferential surface of a portion, matching the annular convex rib 13 of the cartridge core 1, of the housing 2 is adaptively provided with an annular groove 22, and the convex ribs 13 and the annular groove 22 may rotate relatively. The cartridge core 1 and the housing 2 match each other through the annular groove 22 and the annular convex rib 13, with only one degree of freedom. That is, the cartridge core and the housing may rotate relatively but may not move axially. A front end of the annular convex rib 13 of the cartridge core 1 is provided with an elastic cambered flat spring 14, a root of the flat spring 14 is connected to a wall portion of the cartridge core 1 into a whole, and an end of the flat spring 14 warps to be slightly higher than a surface of the cartridge core 1, the flat spring 14 is clamped in the groove correspondingly provided in an inner side surface of the housing 2 after assembled to prevent the cartridge core 1 from being separated from the housing 2. For the convenience of assembly or disassembly when necessary, an outer side surface of the end of the flat spring 14 is designed in a forward slope structure or a double-sided inclined herringbone structure, as shown in FIG. 5 and FIG. 6.

Figure 7:
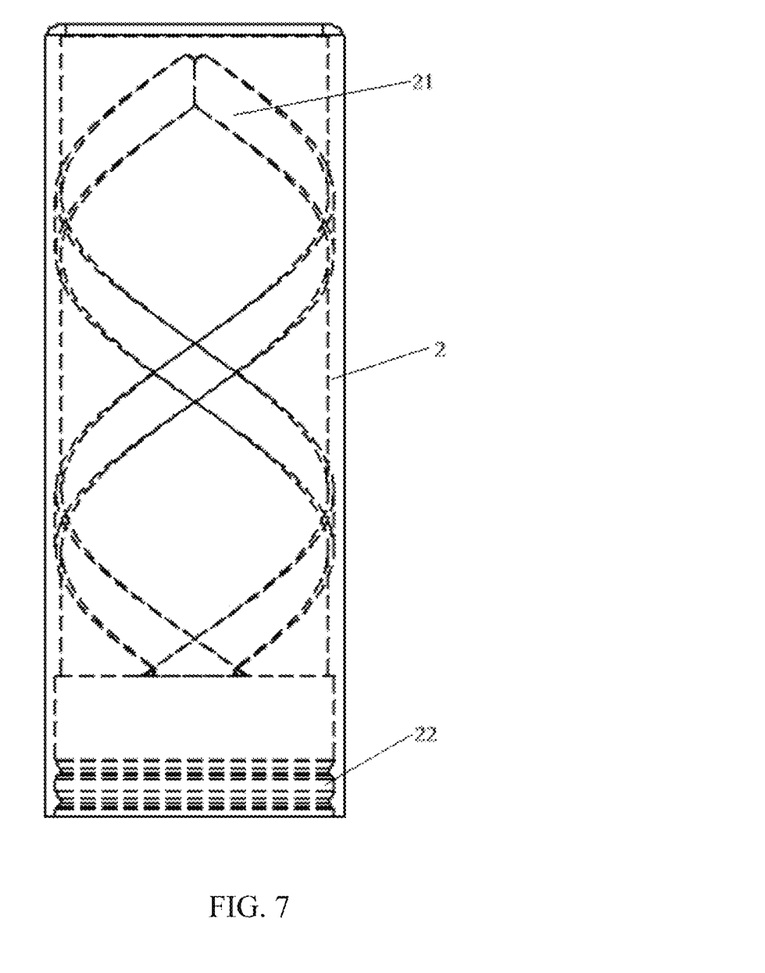
FIG. 7 is a sectional schematic diagram of a housing.
Figure 8:
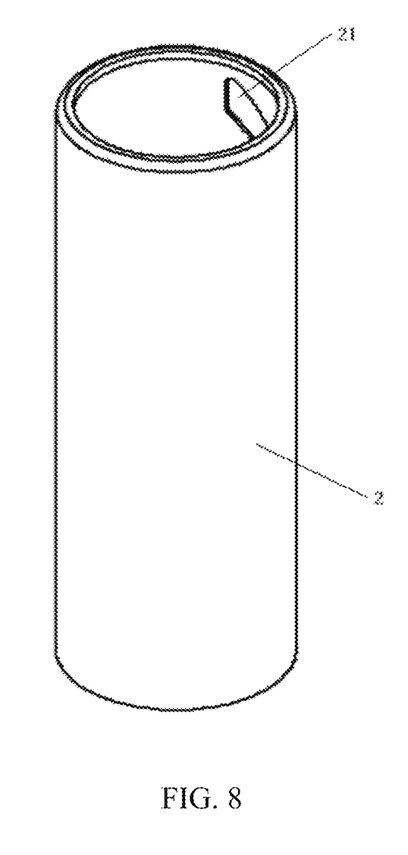
FIG. 8 is a three-dimensional schematic diagram of the housing.

A rotation direction of the spiral groove 21 is right-handed, which is adapted to the habit of operating and rotating with right hands of most users. It is certain that a left-handed structure may be used in rare cases, but should be indicated in a manual, as shown in FIG. 7 and FIG. 8.

Double threads are evenly distributed on the spiral grooves 21 on the inner wall of the housing 2, the guide grooves 11 of the cartridge core 1 are two symmetrical grooves, and the two corresponding pillars 31 protruding from the outer surface of the lipstick cylinder 3 are symmetrically arranged.

Each of two ends of the guide groove 11 is provided with a transverse side groove 15 in an extension manner, and an extension direction of the side groove 15 is opposite to the rotation direction of the spiral groove 21, and an opening is reserved between the side groove 15 at a front end and an end of the cartridge core 1 to facilitate assembly of the lipstick cylinder 3. A mouth of the side groove 15 is provided with a cambered protrusion point 16, and a width from the protrusion point 16 to the other side of the mouth of the side groove 15 is slightly smaller than a diameter of the pillar 31. A technical narrow slit 17 is provided between a front end of a guide groove 11 and a front end surface of the cartridge core 1, the technical narrow slit 17 being used for facilitating assembly of the protruding pillar 31 of the lipstick cylinder 3 and the cartridge core 1.

A spiral inclination angle of the spiral groove 21 is 28°. The angle should take into account both a moving speed and moving resistance. If the angle is too large, thread rotation resistance may increase, resulting in jamming and even system self-locking.

An outer circumferential surface of the hand-held section 12 of the rear end of the cartridge core 1 is provided with a straight or rhombic pattern. The hand-held section 12 is always designed to be relatively short in consideration of saving materials and occupying less space, but such design may affect holding force. Therefore, the pattern is designed for facilitating holding of the cartridge core 1 to promote the cartridge core 1 and the housing 2 to rotate relatively, and then combined force of the spiral groove 21 and the guide groove 11 is utilized to push the lipstick mechanism 3 to move axially.

Figure 9:
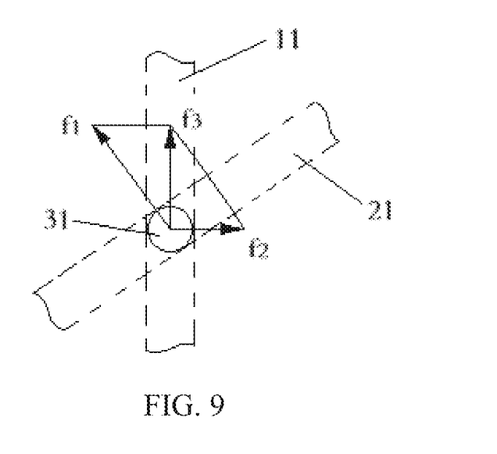
FIG. 9 is a schematic diagram of stress on a protruding pillar.

FIG. 9 shows stress resultant of a platform pillar. In the figure, the inclination angle of the spiral groove 21 is 30°, that is, an included angle between an expansion line of the guide groove 11 and an expansion line of the spiral groove 21 is 60°. f1 is thrust of the spiral groove 21 of the housing 2 against the pillar 31, and f2 is reverse thrust of the guide groove 11 of the cartridge core 1 against the pedestal 31. Since the protruding pillar 31 is in smooth surface contact with the spiral groove 21, and the protruding pillar 31 and the guide groove 11 are also in smooth surface contact similarly, so it may be determined that a direction of acting force of the spiral groove 21 against the protruding pillar 31 and a direction of acting force of the guide groove 11 against the protruding pillar 31 necessarily point to normal directions of surfaces of the spiral groove and the guide groove, that is, a direction of the f1 is perpendicular to a wall surface of the spiral groove 21, a direction of the f2 is perpendicular to a wall surface of the guide groove 11, resultant force of the f1 and the f2 is f3, and the direction of the force is shown in FIG. 9. The resultant force f3 points forward, and the f3 pushes the pillar and the lipstick cylinder to move forward.

Twelve reinforcing ribs 32 are uniformly distributed axially on an inner surface of the lipstick cylinder 3, and the reinforcing ribs 32 are arranged to enhance a strength of the lipstick cylinder 3 and have the function of preventing a lipstick from slipping out of the lipstick cylinder 3.

All the parts, including the cartridge core 1, the housing 2 and the lipstick cylinder 3, of the device are all of colorless, transparent or translucent structures uniformly made from food packaging grade nontoxic material polyethylene terephthalate (PET), with partial surfaces properly roughened. The device is suitable for color exposure of cosmetic lipsticks, easy to identify, non-toxic and hygienic and safe, and may be recycled as a whole, thereby meeting the requirements of environmental protection standards. Color exposure also helps to increase beauty of appearance of goods.

Embodiment 2

Figure 10:
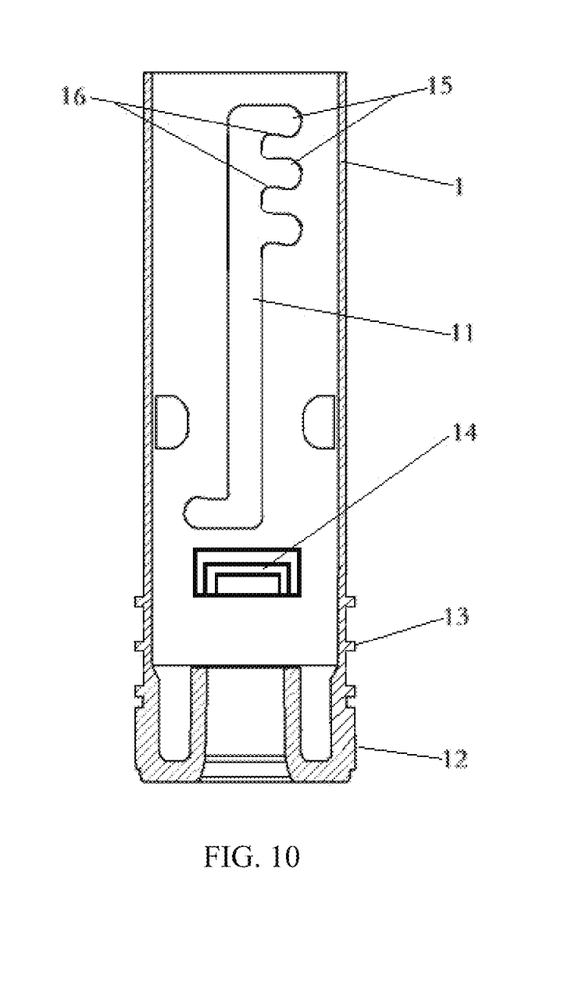
FIG. 10 is a structural schematic diagram of a cartridge core of Embodiment 2.

A portion from a middle to a front end of a guide groove 11 is provided with several additional side grooves parallel to each transverse side groove 15 extended in two ends, and an extension direction of the several side grooves is the same as that of the side groove 15 of the front end. A portion, close to a hand-held section 12 at a rear end, of a cartridge core 1 is provided with three annular convex ribs 13, and a certain distance is reserved between the three annular convex ribs 13, as shown in FIG. 10.

Figure 11:
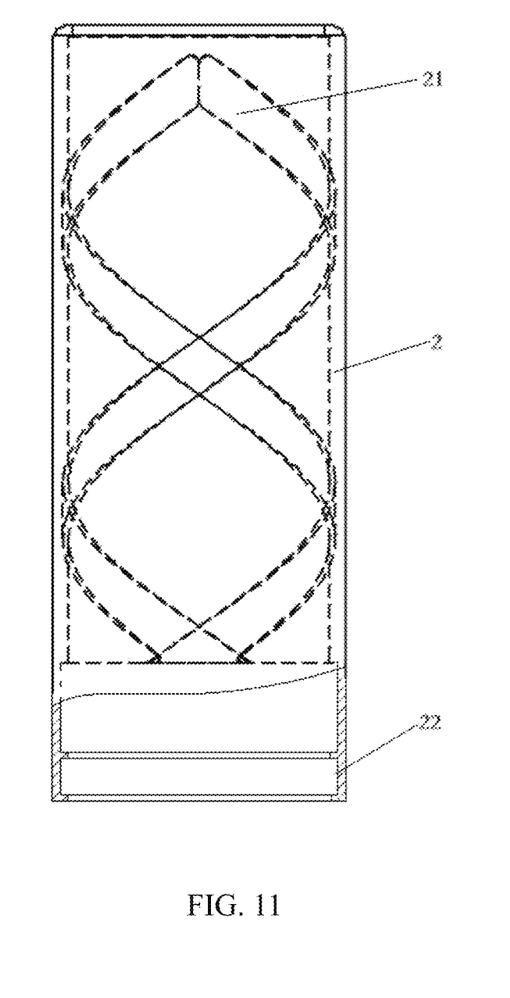
FIG. 11 is a structural schematic diagram of a housing of Embodiment 2.

A housing 2 is provided with two annular grooves 22, and a certain width is reserved between the two annular grooves 22, as shown in FIG. 11.

Figure 12:
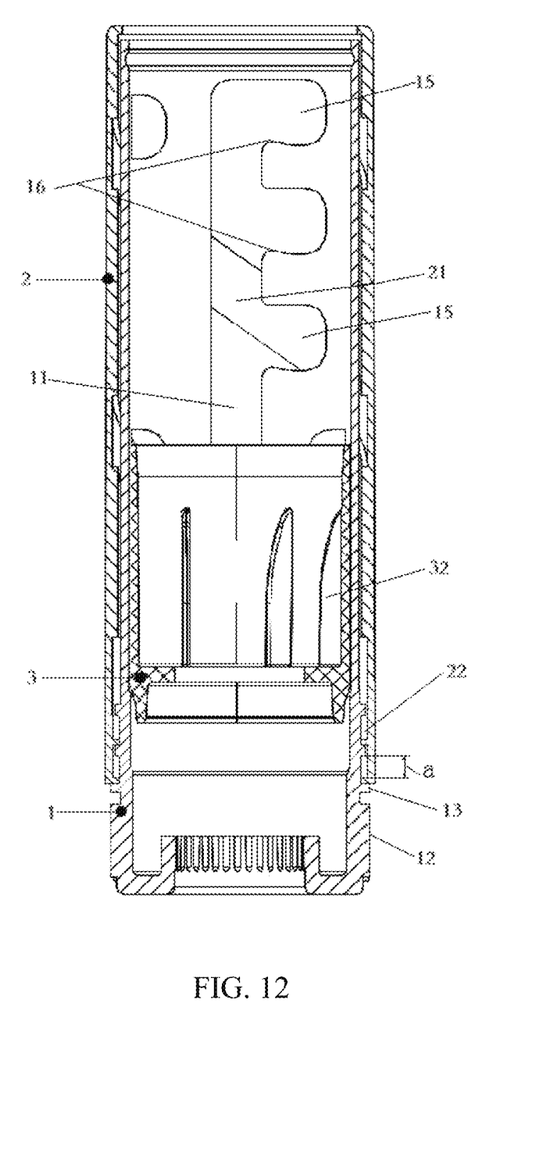
FIG. 12 is an assembly diagram of Embodiment 2.

The three annular convex ribs 13 have certain axial clearances a after matching the two annular grooves 22. The cartridge core and the housing may axially have a certain relative slide distance through the clearance. When a user holds the hand-held section of the cartridge core with one hand and holds the housing with the other hand to rotate the cartridge core and the housing relatively, if the three annular convex ribs 13 abut against rear side edges of the two annular grooves 22 at this time, a pillar 31 may be inserted into a first side groove first, and then the pillar 31 is slightly reversed to withdraw from the first side groove, the pillar continues to rotate forward and apply appropriate pulling force to the housing at the same time, and then the pillar 31 may skip the first side groove and continue to move forward to be inserted into a second side groove. The above steps are repeated until the pillar is inserted into an end side groove. If the pillar 31 is selected to be inserted into a second side groove at the beginning, a rotation torque is applied to the housing 2, pulling force is applied when the pillar approaches a mouth of a first side groove. When the pillar 31 moves and crosses the first groove due to the pulling force, pulling force is stopped, such that the pillar 31 stops being pulled and only rotates to continuously move forward to be inserted into the second side groove. With multiple side grooves capable of positioning, the user may operate as required to make the lipstick cylinder 3 protrude out of the end of the cartridge core 1 by a proper length, as shown in FIG. 12.

The other structures are the same as those of Embodiment 1.

Embodiment 3

Figure 13:
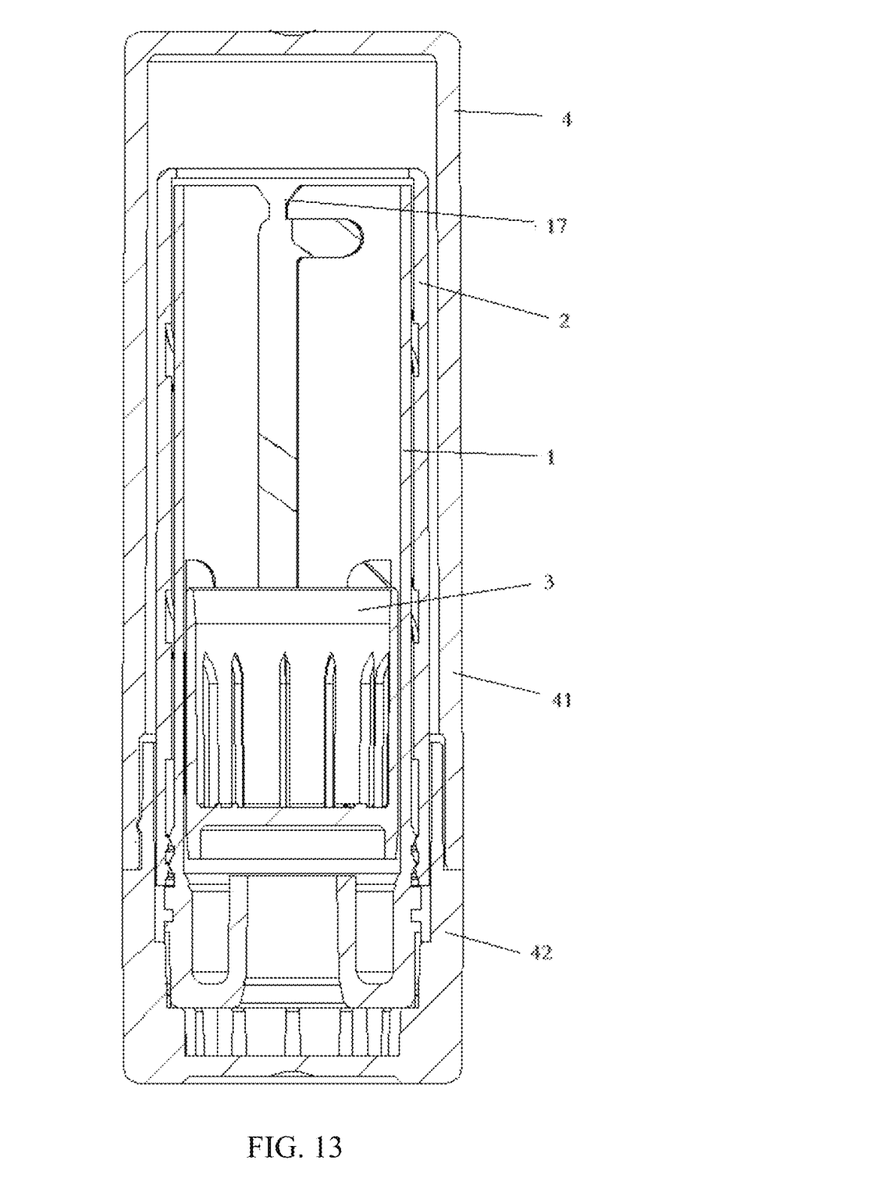
FIG. 13 is a structural schematic diagram of another embodiment.

A cap 4 is adaptively arranged outside a housing 2, and the cap 4 is formed by matching a front cap body 41 and a rear cap body 42. The other structures are the same as those of Embodiment 1, as shown in FIG. 13.

Embodiment 4

The flat spring 14 is of one or more hollowed structures, when one flat spring 14 is arranged, the flat spring is wrapped around an outer side wall of a cartridge core 1 by one circle, when more than one flat spring 14 is arranged, the flat springs are uniformly distributed on an outer side wall of a cartridge core 1. The hollowed structure includes several spacers, a root of the spacer in a middle is connected to a wall portion of the cartridge core 1, a hardness and a thickness of the root of the spacer in the middle are greater than those of other spacers, an end of the spacer in the middle is provided with a protrusion outwards, the protrusion abuts against an inner side wall of a housing 1, and the protrusion becomes thinner outwards, so as to have a shape similar to a back of a horn comb; and a bottom of a hand-held section 12 is provided with a protruding outer edge, the protruding outer edge being arranged in a position where an annular groove\an annular convex rib on an outer circumference of the hand-held section 12 rotates relative to an annular convex rib\an annular groove on the housing 2.

The spacer in the middle on the flat spring has three main functions: firstly, the flat spring plays the role of fixing the cartridge core and the housing; secondly, since a diameter of the spacer in the middle on the flat spring is greater than that of other portions of the cartridge core, when the cartridge core is clamped inside the housing and the hand-held section is rotated manually, touch friction between other portions of the wall portion of the cartridge core and the housing is avoided, such that a user may rotate the device with rotation force, and use the device easily; and thirdly, the shape, similar to the back of the horn comb, of the spacer in the middle on the flat spring may reduce friction force between the wall portion of the cartridge core and the inner side wall of the housing.

The protruding outer edge has a limiting function, that is, the spacer in the middle on the flat spring on the cartridge core is clamped on the inner side wall of the housing, and with the aid of a limiting function of the protruding outer edge on the hand-held section, the cartridge core may be firmly fixed in the housing and may rotate relatively.

The above shows and describes the basic principles, essential features and advantages of the present disclosure. It should be understood by those skilled in the art that, the present disclosure is not limited by the aforementioned examples. The aforementioned examples and the description only illustrate the principle of the present disclosure. Various changes and modifications may be made to the present disclosure without departing from the spirit and scope of the present disclosure. Such changes and modifications all fall within the claimed scope of the present disclosure. The protection scope of the present disclosure is defined by the appended claims and their equivalents.

What is claimed is:

1. A 100% recyclable and replaceable eco-friendly polyethylene terephthalate (PET) lipstick mechanism, comprising a forked cartridge core, wherein a circular-tubular housing rotationally matches an outside of the cartridge core, an axially slidable lipstick cylinder matches an inside of the cartridge core, an inner wall surface of the housing is provided with a spiral groove, the cartridge core is provided with a guide groove axially, and an outer surface of the lipstick cylinder is provided with a protruding pillar, the pillar penetrating the guide groove of the cartridge core to slidably match the spiral groove of the inner wall surface of the housing; an outer circumferential surface of a rear end of the cartridge core is provided with a hand-held section, an outer circumference of a portion, close to the hand-held section at the rear end, of the cartridge core is provided with at least one annular groove or an annular convex rib, and an inner circumferential surface of a portion of the housing is adaptively provided with an annular convex rib or an annular groove for rotatably matching the at least one annular groove or the annular convex rib of the cartridge core; and a front end of the at least one annular groove or the annular convex rib of the cartridge core is provided with an elastic cambered flat spring, a root of the flat spring is connected to a wall portion of the cartridge core into a whole, an end of the flat spring warps upwards to a position higher than a surface of the cartridge core, and the flat spring is clamped in the annular groove correspondingly provided in an inner side surface of the housing after assembled, so as to prevent the cartridge core from being separated from the housing.

2. The lipstick mechanism according to claim 1, wherein double threads are evenly distributed on the spiral groove on the inner wall of the housing, the guide groove of the cartridge core includes two symmetrical straight grooves, and two corresponding pillars protruding from the outer surface of the lipstick cylinder are symmetrically arranged.

3. The lipstick mechanism according to claim 1, wherein each of two ends of the guide groove is provided with a transverse side groove in an extension manner, and an extension direction of the side groove is opposite to a rotation direction of the spiral groove connected thereto, a mouth of the side groove is provided with a cambered protrusion point, and a width from the protrusion point to the other side of the mouth of the side groove is slightly smaller than a diameter of the pillar.

4. The lipstick mechanism according to claim 3, wherein a spiral inclination angle of the spiral groove is 25°-30°.

5. The lipstick mechanism according to claim 4, wherein the protruding pillar and the lipstick cylinder are of an integrated structure made through injection molding, and the housing, the cartridge core and the lipstick cylinder are all of colorless, transparent or translucent structures uniformly made from food packaging grade nontoxic material PET, with partial surfaces roughened.

6. The lipstick mechanism according to claim 5, wherein the outer circumferential surface of the rear end of the cartridge core is provided with the hand-held section, an outer circumferential surface of which is provided with a straight or rhombic pattern.

7. The lipstick mechanism according to claim 6, wherein an inner surface of the lipstick cylinder is provided with several reinforcing ribs axially.

8. The lipstick mechanism according to claim 7, wherein a portion from a middle to a front end of the guide groove is provided with several additional side grooves parallel to each transverse side groove extended in two ends, and an extension direction of the several side grooves is same as that of the side groove of the front end; a portion, close to the hand-held section at the rear end, of the cartridge core is provided with three annular convex ribs, and a distance is reserved between the three annular convex ribs; and the housing is provided with two annular grooves, a width is reserved between the two annular grooves, the three annular convex ribs have axial clearances after matching the two annular grooves.

9. The lipstick mechanism according to claim 7, wherein a cap is adaptively arranged outside the housing, and the cap is formed by matching a front cap body and a rear cap body.

10. The lipstick mechanism according to claim 1, wherein the flat spring is of one or more hollowed structures, when one flat spring is provided, the flat spring is wrapped around an outer side wall of the cartridge core by one circle, and when more than one flat spring is provided, the flat springs are uniformly distributed on an outer side wall of the cartridge core; the hollowed structure comprises several spacers, a root of the spacer in a middle is connected to a wall portion of an inner body, a hardness and a thickness of the root of the spacer in the middle are greater than those of other spacers, an end of the spacer in the middle is provided with a protrusion outwards, the protrusion abuts against an inner side wall of the housing, and the protrusion becomes thinner outwards, so as to have a shape similar to a back of a horn comb; and a bottom of the hand-held section is provided with a protruding outer edge, the protruding outer edge being arranged in a position where the at least one annular groove or the annular convex rib on the outer circumference of the hand-held section rotates relative to the annular convex rib or the annular groove on the housing.

\* \* \* \* \*